Dec. 20, 1960  W. W. SHEPHERD  2,964,863
MACHINE WITH MOVABLE TRUNNIONS
Filed Sept. 30, 1957  2 Sheets-Sheet 1

INVENTOR.
WILLARD W. SHEPHERD

BY HIS ATTORNEYS.
HARRIS, KIECH, FOSTER & HARRIS

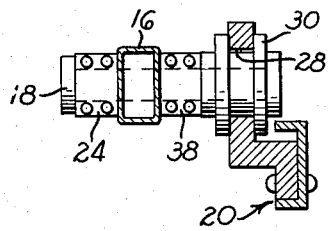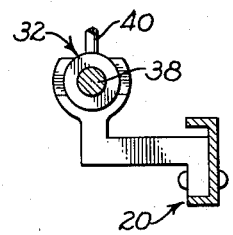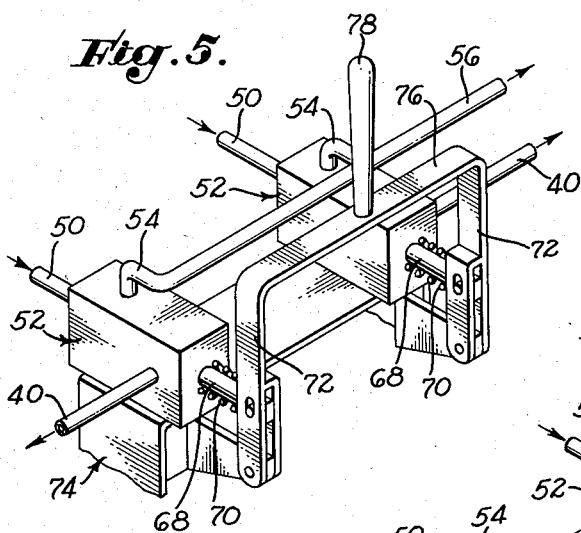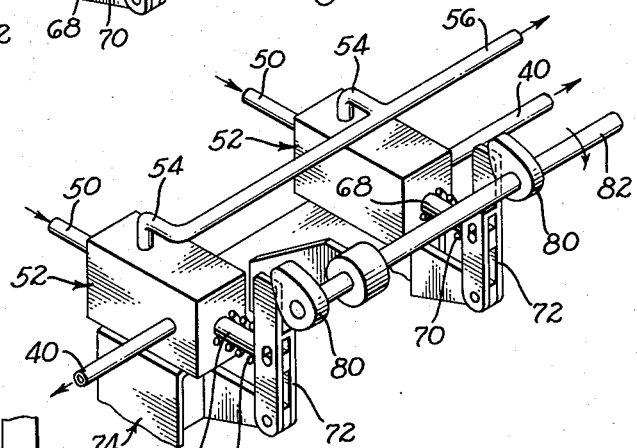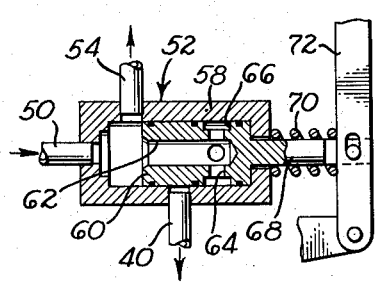
INVENTOR.
WILLARD W. SHEPHERD
BY HIS ATTORNEYS.
HARRIS, KIECH, FOSTER & HARRIS 
United States Patent Office 2,964,863
Patented Dec. 20, 1960

2,964,863

MACHINE WITH MOVABLE TRUNNIONS

Willard W. Shepherd, Whittier, Calif., assignor to Shepherd Machinery Co., Los Angeles, Calif., a limited partnership Filed Sept. 30, 1957, Ser. No. 686,914

4 Claims. (Cl. 37—144)

The present invention relates generally to earth working and/or moving machinery and, more particularly, to a machine which includes a vehicle having an earth working and/or moving implement mounted thereon. Preferably, the vehicle is a self-propelled unit such as a tractor, which may either be of the crawler type or the wheeled type, although the vehicle may also be propelled by other means. The vehicle of the machine of the invention may be provided with various implements, such as a bulldozer blade, a ripper, a scraper blade, a push-loading scraper, a backfilling blade, or the like. Also, the vehicle may move either forwardly or rearwardly to bring such implements into operation, the direction of movement of the vehicle depending on the nature of the implement.

For convenience, this disclosure will be restricted hereinafter to a consideration of a bulldozer comprising a crawler-type tractor having a bulldozer blade and/or a ripper mounted thereon. However, it will be understood that the invention is not to be regarded as specifically limited thereto, but is to be accorded the broader scope set forth in the preceding paragraph, except as otherwise provided by the claims hereinafter appearing.

A primary object of the invention is to provide a bulldozer which includes a tractor having a bulldozer blade mounted thereon for forward bodily movement relative to the tractor in the direction of the fore-and-aft axis of the tractor, and which includes means for moving the bulldozer blade bodily forwardly relative to the tractor so as to apply to the bulldozer blade a forward propelling force supplementing the forward propelling force applied thereto by the tractor itself. A related object is to provide hydraulic means for moving the bulldozer blade bodily relative to the tractor in a forward direction in cyclical or pulsing fashion.

With the foregoing construction, when the load imposed on the bulldozer blade reaches a value sufficient to substantially prevent further forward movement of the tractor, the hydraulic means is energized to move the blade bodily forward relative to the tractor in a cyclical manner. This applies a pulsing type of thrust to the bulldozer blade with the result that greatly increased peak thrust forces are produced. Consequently, the tractor is able to continue its forward progress under conditions which would stall it without the application of peak thrust forces to the blade in cyclical fashion in accordance with the invention.

Thus, the effect of the invention is to greatly increase the capacity of the bulldozer, which is an extremely important feature.

It will be understood that similar results may be achieved with other implements, such as push-loading scrapers, rippers, or the like. For example, in ripping heavy materials such as granite, the application of a pulsing type of thrust to the ripper greatly increases breakout pressures and thus permits continued ripping under conditions which would stall the tractor otherwise.

Preferably, the implement is mounted on the tractor by means of trunnions in the conventional manner, an important object of the invention being to render the implement bodily movable in the direction of the fore-and-aft axis of the tractor by mounting the trunnions on the tractor for movement in such direction.

Another object is to provide hydraulic rams connected to the tractor and respectively connected to the movable trunnions to produce the desired bodily movement of the implement relative to the tractor, the rams being so connected to the tractor and the trunnions as to produce forward bodily movement of the implement in most instances, although they may be mounted to produce rearward bodily movement thereof in the case of a backfilling scraper, or the like. Preferably, these rams are single-acting rams which produce trunnion and implement movement in one direction only upon application of fluid pressure thereto, implement and trunnion movement in the opposite direction being produced by the load of the implement. However, double-acting rams may be utilized also, if desired.

Another object of the invention is to provide means for automatically applying a pulsing fluid pressure to the hydraulic rams to achieve the pulsing or cyclical thrust discussed above. Another object in this connection is to provide valves controlling the delivery of fluid under pressure to the hydraulic rams and to provide cam means for automatically moving the valves to positions to apply fluid pressure to the rams in a cyclical fashion.

The invention contemplates connecting two or more alternately operable implements, such as bulldozer blade and a ripper, to the movable trunnions so that the same rams are used to pulse whichever implement is in operation. However, separate trunnions may be provided for each implement, and each pair or set of trunnions may be provided with its own hydraulic rams.

The foregoing obejcts, advantages, features and results of the present invention, together with various other objects, advantages, features and results thereof which will be apparent in the light of this disclosure, may be attained with the exemplary embodiments of the invention described in detail hereinafter and illustrated in the accompanying drawings, in which.

Figure 1:
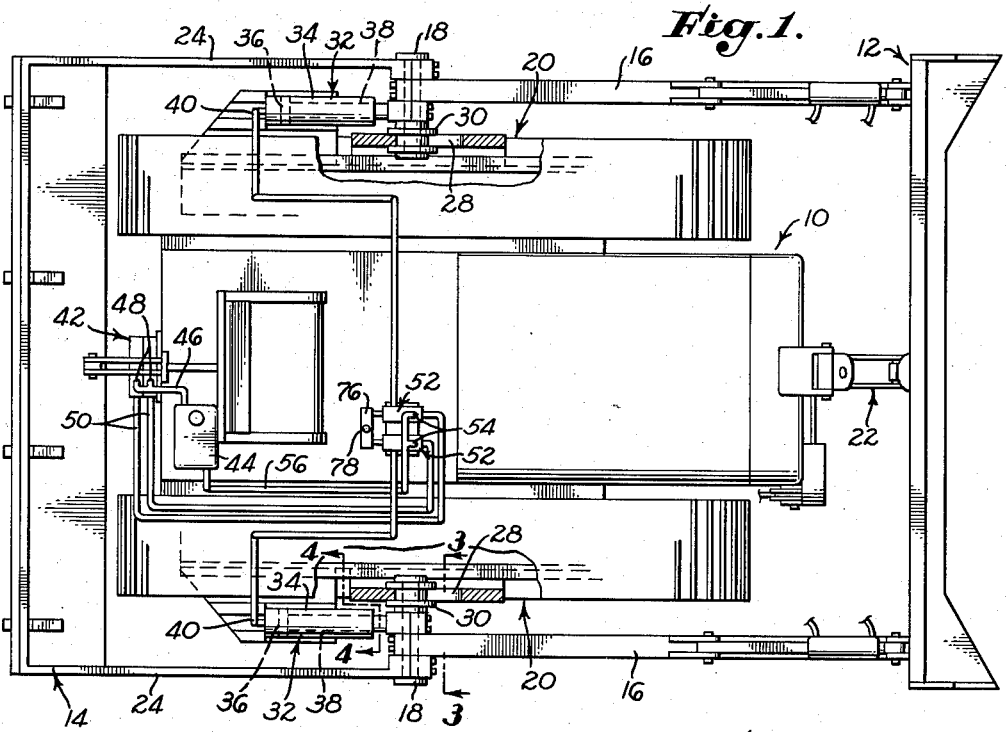
Fig. 1 is a plan view of a bulldozer embodying the invention.

Figs. 3 and 4 are enlarged, fragmentary, sectional views respectively taken along the arrowed lines 3—3 and 4—4 of Fig. 1;

Fig. 5 is a diagrammatic isometric view of a valve system for pulsing the implement of the bulldozer;

Fig. 6 is a diagrammatic isometric view of another embodiment of a valve system for pulsing the implement; and Fig. 7 is a sectional view of a valve of the valve systems of Figs. 5 and 6 of the drawings.

Figure 2:
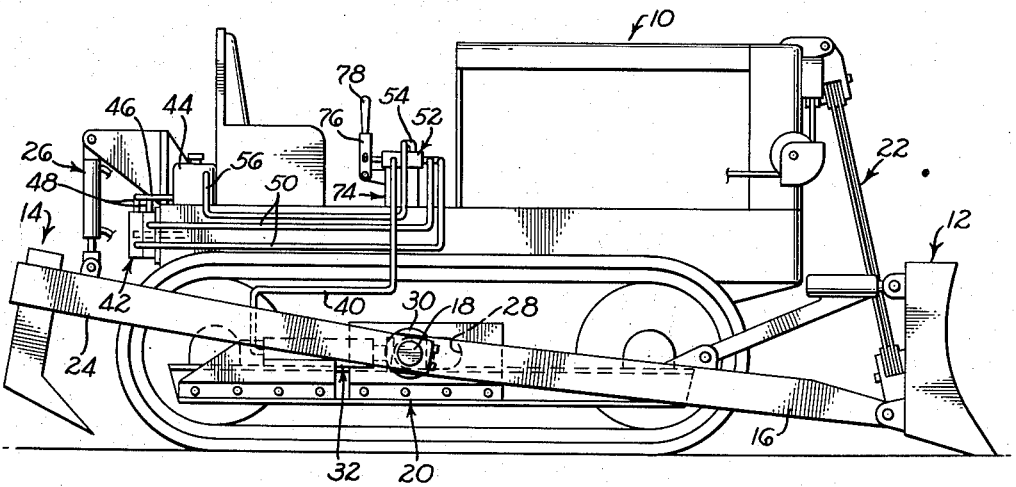
Fig. 2 is a side view of the bulldozer.

Referring first to Figs. 1 and 2 of the drawings, the bulldozer illustrated therein includes a crawler-type tractor 10 carrying a bulldozer blade 12 and a ripper 14. The blade 12 is mounted on rearwardly extending arms 16 respectively disposed on opposite sides of the tractor 10 and respectively pivotally mounted at their rearward ends on trunnions 18. These trunnions are carried by track frames 20 on opposite sides of the tractor 10 and extend horizontally outwardly on opposite sides of the tractor in substantially axial alignment. The bulldozer is provided with a cable control 22 for the bulldozer blade 12, this cable control serving to raise and lower the bulldozer blade about the axis of the trunnions 18 in the conventional manner. The ripper 14 is provided with forwardly extending arms 24 which are also pivotally mounted at their forward ends on the trunnions 18, although it will be understood that separate trunnions, not shown, may be provided for the ripper if desired. A hydraulic control 26 serves to raise and lower the ripper 14 about the axis of the trunnions 18 and, as will be apparent, either the bulldozer blade 12 or the ripper 14 may be placed in operation by means of the corresponding control 22 or 26.

In accordance with the present invention, the trunnions 18 are mounted on the frames 20 for bodily movement relative to the tractor 10 in the fore-and-aft direction, i.e., along paths parallel to the fore-and-aft or longitudinal axis of the tractor. To provide for bodily fore-and-aft movement of the trunnions 18, the track frames 20 are provided with suitable tracks 28 and the trunnions are provided with suitable track followers 30 respectively engageable with the tracks 28. The tracks 28 and the track followers 30 may take various forms and they are shown semidiagrammatically only for convenience. In the particular construction illustrated, the tracks 28 are merely shown as elongated slots and the track followers 30 are shown as flanged rollers disposed in these slots, such flanged rollers being mounted on the trunnions 18.

To produce movement of the trunnions 18 in the fore-and-aft direction, hydraulic rams 32 are respectively connected to the trunnions and to the track frames 20. In the particular embodiment illustrated, the rams 32 are simple, single-acting rams each comprising a cylinder 34 anchored to the corresponding track frame 20 and a piston 36 having a piston rod 38 connected to the corresponding trunnion 18. In the embodiment under consideration, the hydraulic rams 32 are connected to the track frames 20 rearwardly of the trunnions 18 and fluid under pressure is admitted to the rearward ends of the cylinders 34 through pressure lines 40 to move the trunnions forwardly relative to the tractor 10. However, the rams 32 may also be arranged to produce rearward movement of the trunnions for some applications if desired.

Considering the manner in which the rams 32 are supplied with fluid under pressure through the pressure lines 40, the rams are preferably pressurized independently of each other from a fluid pressure source which may comprise a dual pump 42 driven by the engine of the tractor 10, for example, by a suitable power take-off, not shown. The two halves of the dual pump 42 are supplied with fluid from a reservoir 44 through a main intake line 46 and branch intake lines 48. Discharge or outlet lines 50 lead from the two halves of the dual pump 42 to valves 52 each having a pressure position wherein it connects the corresponding discharge line 50 to the corresponding pressure line 40 leading to one of the rams 32. Each of the valves 52 also has a return position wherein it connects the corresponding discharge line 50 to a branch return line 54, the two branch return lines leading to a main return line 56 which conveys the fluid back to the reservoir 44.

As shown in Fig. 7, each valve 52 may comprise a valve body 58 having therein a valve member 60 movable between pressure and return positons, the return position being shown in Fig. 7. When the valve member 60 is in this position, it uncovers the corresponding discharge and return lines 50 and 54 to establish communication therebetween. When the valve is moved to the left, as viewed in Fig. 7, from the return position shown into its pressure position, fluid from the corresponding discharge line 50 flows through an axial bore 62 in the valve member and through radial ports 64 and an external annular groove 66 therein into the corresponding pressure line 40.

Each valve 52 includes an axially projecting stem 68 connected to the corresponding valve member 60 and encircled by a compression spring 70 which is seated at one end against the corresponding valve body 58 and at its other end against an intermediate point on a lever 72. Each lever 72 is pivotally connected at one end to a suitable supporting structure 74 for the valves 52. As will be apparent, the compression springs 70 bias the levers 72 in directions such that the levers, acting through the valve stems 68, maintain the valve members 60 in their return positions. By moving the levers 72 in the opposite direction in opposition to the actions of the springs 70, the valve members 60 may be moved into their pressure positions to connect the discharge lines 50 from the pump 42 to the pressure lines 40 leading to the rams 32.

In the embodiment illustrated in Figs. 1 to 5 and 7 of the drawings, the two levers 72 are formed by the arms of a yoke 76 having a handle 78 operable by the driver of the tractor 10. In the embodiment of Figs. 6 and 7, the two levers 72 are engageable by cams 80 on a cam shaft 82 which may be rotated to produce periodic or cyclical movement of the valve members 60 to their pressure positions. The cam shaft 82 may be driven in any suitable manner, as by an electric motor, a power take-off from the engine of the tractor 10, a hand crank, or the like.

Considering the operation of the invention, it will be assumed that the bulldozer blade 12 is in use and is in engagement with an obstacle which tends to prevent further forward movement of the tractor 10. This obstacle may be a tree, a boulder, unusually hard ground, or the like. When this situation develops, the operator of the tractor 10 moves the handle 78 forwardly, in the particular construction illustrated, in a cyclical manner to apply a pulsing thrust to the bulldozer blade 12. Each time the handle 78 is moved forwardly, pressure is applied to the rams 32 to move the trunnions 18 forwardly relative to the tractor 10, and thus to move the blade 12 forwardly, the effect of pressurizing the rams in this fashion being to greatly increase the forward thrust applied to the blade 12. Each time the handle 78 is permitted to move rearwardly to move the valve members 60 into their return positions, the trunnions 18 move rearwardly relative to the tractor to permit the tractor to move forwardly the distance gained by the forward movement of the blade 12 produced by the rams. By cyclically moving the handle 78 forwardly and rearwardly in this fashion, the bulldozer blade 12 is kicked forwardly in pulsing fashion to permit continued forward progress of the tractor 10. With such a pulsing thrust application to the bulldozer 12, obstacles which would stop a conventional bulldozer are easily overcome, which is an important feature of the invention.

Considering the embodiment of Figs. 6 and 7, the operation of this embodiment is very similar, except that the pulsing pressure application to the pistons 36 of the rams 32 is produced automatically by the cams 80, instead of manually by manipulation of the handle 78. In all other respects, the operation is similar.

It will be understood that while the operation of the invention has been considered in connection with the bulldozer blade 12, similar results may be achieved when using the ripper 14 instead of the bulldozer blade, or when using some other attachment or implement.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In combination: a vehicle having forward and rearward ends; two trunnions respectively mounted on opposite sides of said vehicle between said forward and rearward ends thereof for movement relative to said vehicle in the fore-and-aft direction, said trunnions having a common horizontal axis which is perpendicular to said fore-and-aft direction; an implement located adjacent one of said ends of said vehicle and spaced from said vehicle in said fore-and-aft direction; two arms respectively disposed on opposite sides of said vehicle and respectively having ends pivotally connected to said trunnions so as to render said arms pivotable relative to said vehicle in vertical planes about said common axis, the opposite ends of said arms being connected to said implement; and means for simultaneously moving said trunnions relative to said vehicle in said fore-and-aft direction.

2. In combination: a vehicle having forward and rearward ends; two trunnions respectively mounted on opposite sides of said vehicle between said forward and rearward ends thereof for movement relative to said vehicle in the fore-and-aft direction, said trunnions having a common horizontal axis which is perpendicular to said fore-and-aft direction; an implement located adjacent one of said ends of said vehicle and spaced from said vehicle in said fore-and-aft direction; two arms respectively disposed on opposite sides of said vehicle and respectively having ends pivotally connected to said trunnions so as to render said arms pivotable relative to said vehicle in vertical planes about said common axis, the opposite ends of said arms being connected to said implement; two hydraulic rams respectively connected to said trunnions for moving said trunnions relative to said vehicle in said fore-and-aft direction; and means for simultaneously energizing said rams.

3. In combination: a vehicle having forward and rearward ends; two trunnions respectively mounted on opposite sides of said vehicle between said forward and rearward ends thereof for movement relative to said vehicle in the fore-and-aft direction, said trunnions having a common horizontal axis which is perpendicular to said fore-and-aft direction; an implement located adjacent one of said ends of said vehicle and spaced from said vehicle in said fore-and-aft direction; two arms respectively disposed on opposite sides of said vehicle and respectively having ends pivotally connected to said trunnions so as to render said arms pivotable relative to said vehicle in vertical planes about said common axis, the opposite ends of said arms being connected to said implement; two hydraulic rams respectively connected to said trunnions for moving said trunnions relative to said vehicle in said fore-and-aft direction; a source of fluid under pressure; two valves respectively connected in series with said rams and connected in series with said source and movable to open positions to energize said rams; and means for simultaneously moving said valves to said open positions.

4. In combination: a vehicle having forward and rearward ends; two trunnions respectively mounted on opposite sides of said vehicle between said forward and rearward ends thereof for movement relative to said vehicle in the fore-and-aft direction, said trunnions having a common horizontal axis which is perpendicular to said fore-and-aft direction; an implement located adjacent one of said ends of said vehicle and spaced from said vehicle in said fore-and-aft direction; two arms respectively disposed on opposite sides of said vehicle and respectively having ends pivotally connected to said trunnions so as to render said arms pivotable relative to said vehicle in vertical planes about said common axis, the opposite ends of said arms being connected to said implement; two hydraulic rams respectively connected to said trunnions for moving said trunnions relative to said vehicle in said fore-and-aft direction; a source of fluid under pressure; two valves respectively connected in series with said rams and connected in series with said source and movable to open positions to energize said rams; and cam means for simultaneously and cyclically moving said valves to said open positions.

References Cited in the file of this patent

UNITED STATES PATENTS

| | | |
|---|---|---|
| 2,499,620 | Alderman | Mar. 7, 1950 |
| 2,660,266 | Maloney | Nov. 24, 1953 |
| 2,687,586 | Dickinson | Aug. 31, 1954 |
| 2,730,823 | Cassidy | Jan. 17, 1956 |
| 2,798,711 | Silver | July 9, 1957 |
| 2,805,847 | Malloy | Sept. 10, 1957 |
| 2,874,489 | Orjala | Feb. 24, 1959 |
| 2,883,775 | DeHardit | Apr. 28, 1959 |

FOREIGN PATENTS

| | | |
|---|---|---|
| 922,158 | Germany | Jan. 10, 1955 |